(12) United States Patent
Wheatley

(10) Patent No.: US 9,277,038 B1
(45) Date of Patent: Mar. 1, 2016

(54) ATTACHABLE KICKSTAND WITH MULTIPLE POSITIONS FOR CELLULAR PHONE

(71) Applicant: David Wheatley, Draper, UT (US)

(72) Inventor: David Wheatley, Draper, UT (US)

(73) Assignee: David Wheatley, Draper, UT (US)

( * ) Notice: Subject to any disclaimer, the term of this patent is extended or adjusted under 35 U.S.C. 154(b) by 0 days.

(21) Appl. No.: 14/564,852

(22) Filed: Dec. 9, 2014

(51) Int. Cl.
*H04B 1/00* (2006.01)
*H04M 1/04* (2006.01)
*A47B 23/04* (2006.01)
*A45F 5/02* (2006.01)
*F41C 33/02* (2006.01)

(52) U.S. Cl.
CPC . *H04M 1/04* (2013.01); *A45F 5/02* (2013.01); *A47B 23/043* (2013.01); *F41C 33/0227* (2013.01)

(58) Field of Classification Search
USPC ........... 455/578.8, 575.9, 90.1; 224/197, 666, 224/269, 669, 930, 271, 679; 248/231.8, 248/316.1, 291.1, 229.16, 292.13
See application file for complete search history.

(56) References Cited

U.S. PATENT DOCUMENTS

| | | | | |
|---|---|---|---|---|
| 3,915,361 A | * | 10/1975 | Perkins | F41C 33/0227 224/198 |
| 3,956,701 A | * | 5/1976 | James, Jr. | G08B 3/1058 224/197 |
| 4,113,212 A | | 9/1978 | Coriden | |
| 5,988,577 A | * | 11/1999 | Phillips | A45F 5/02 224/197 |
| 6,141,417 A | * | 10/2000 | Lopez | A45F 5/021 379/446 |
| 6,508,451 B1 | | 1/2003 | Blythe et al. | |
| 6,752,299 B2 | * | 6/2004 | Shetler | A45F 5/02 224/197 |
| 7,513,472 B2 | * | 4/2009 | Yang | F16M 11/041 224/197 |
| 7,845,612 B2 | | 12/2010 | Mase | |
| 8,162,283 B1 | | 4/2012 | Royz et al. | |
| 8,172,191 B1 | | 5/2012 | Zimbalatti | |
| 8,550,421 B2 | | 10/2013 | Liu | |
| 9,027,814 B2 | * | 5/2015 | Tages | A45F 5/021 224/666 |
| 2007/0075808 A1 | | 4/2007 | Chen | |
| 2012/0252543 A1 | * | 10/2012 | Cho | F16M 11/041 455/575.8 |
| 2012/0305735 A1 | | 12/2012 | McSweyn | |

* cited by examiner

*Primary Examiner* — Ganiyu A Hanidu
(74) *Attorney, Agent, or Firm* — Thorpe, North & Western, LLC

(57) ABSTRACT

A kickstand to be affixed to a back surface of a mobile device or cell phone has a base with an adhesive layer to adhere the base to the back surface of the mobile device. An elongated slot is disposed in the base and has a pair of bores in the slot. An arm is pivotally coupled to the base and disposable in the elongated slot and has an axel with a pair of distal ends each disposed in a different one of the pair of bores. The pair of distal ends of the axel is bifurcated to form a pair of fingers such that the pair of fingers press outwardly against a wall of the pair of bores.

15 Claims, 5 Drawing Sheets

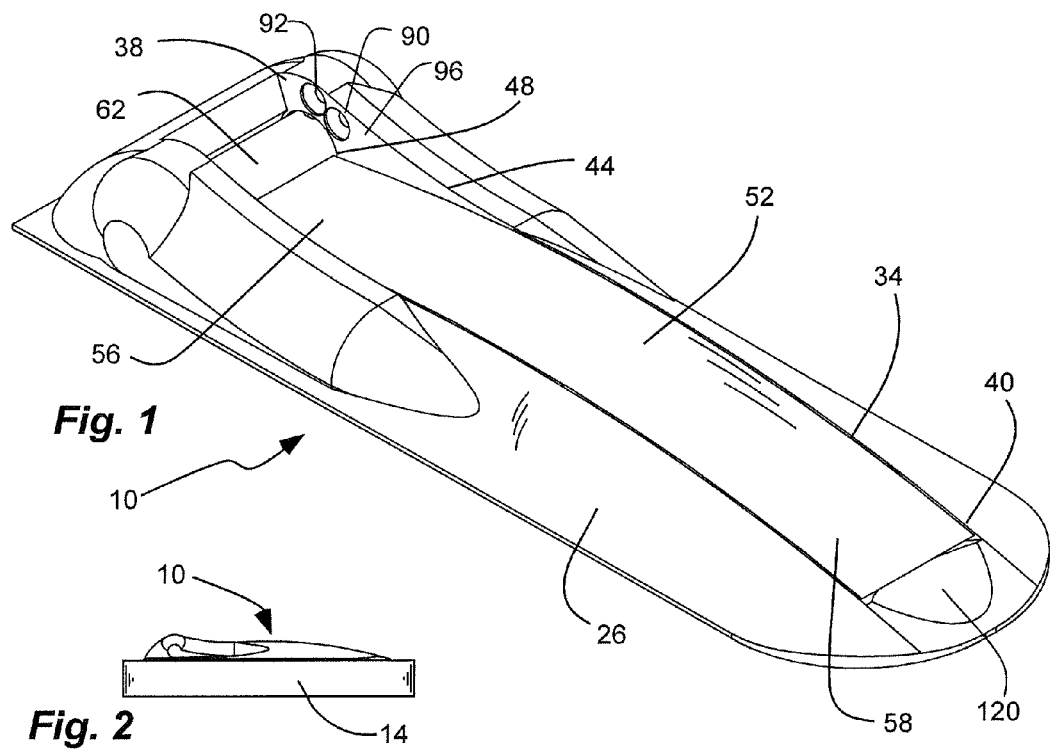
Fig. 1
Fig. 2
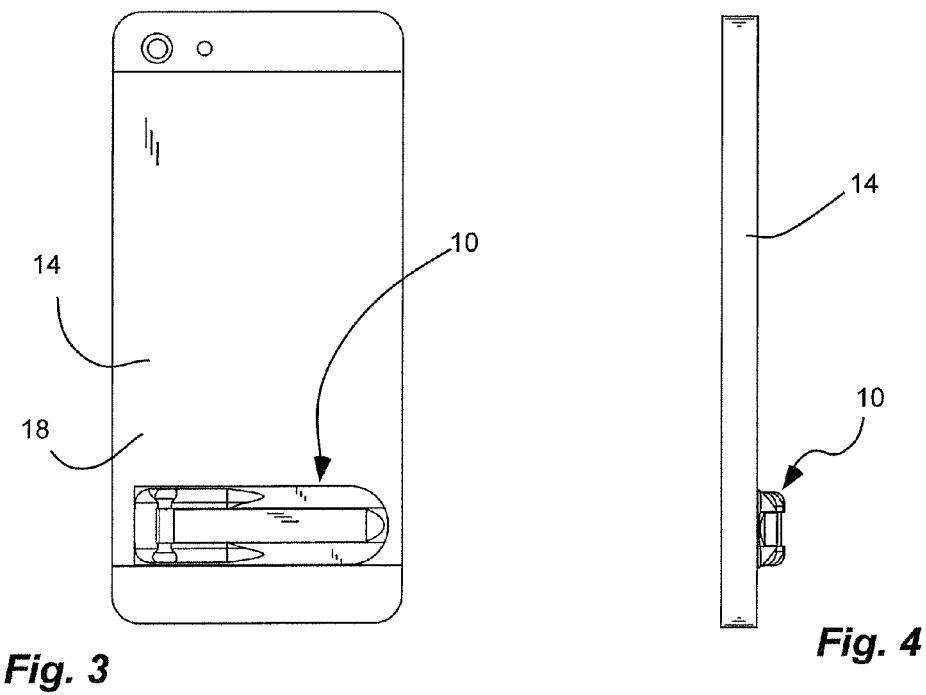
Fig. 3
Fig. 4

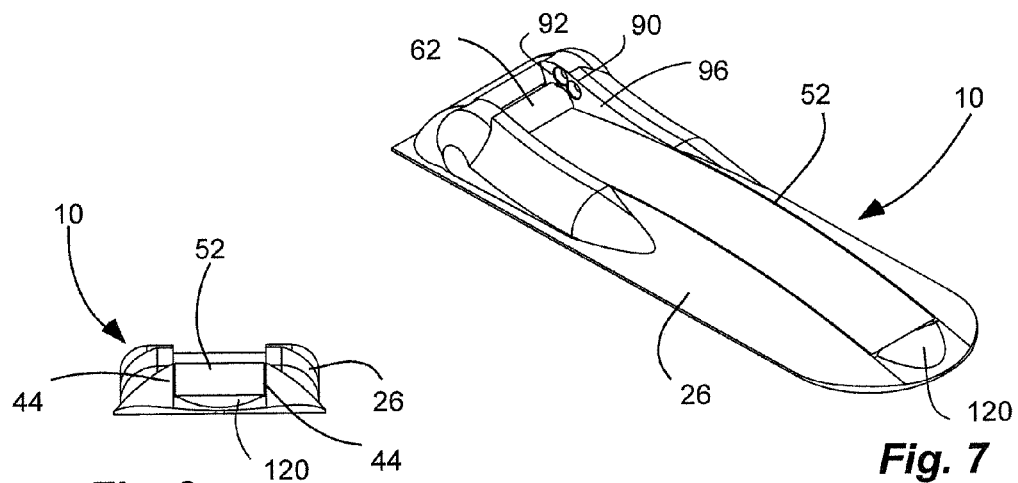
Fig. 7
Fig. 8
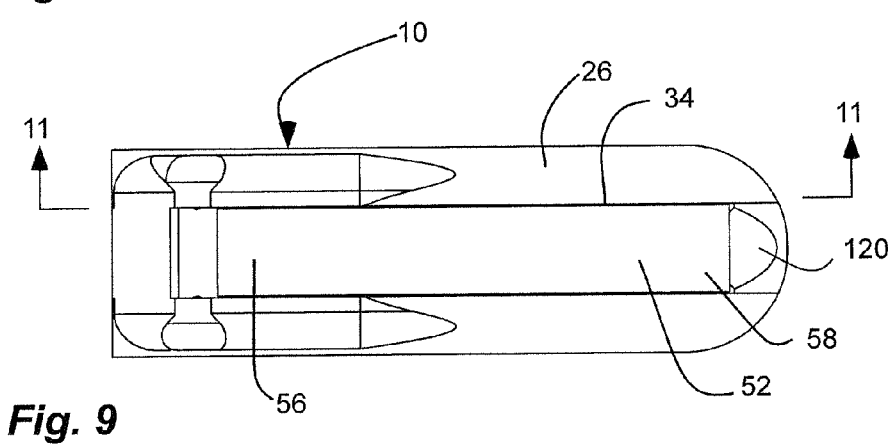
Fig. 9
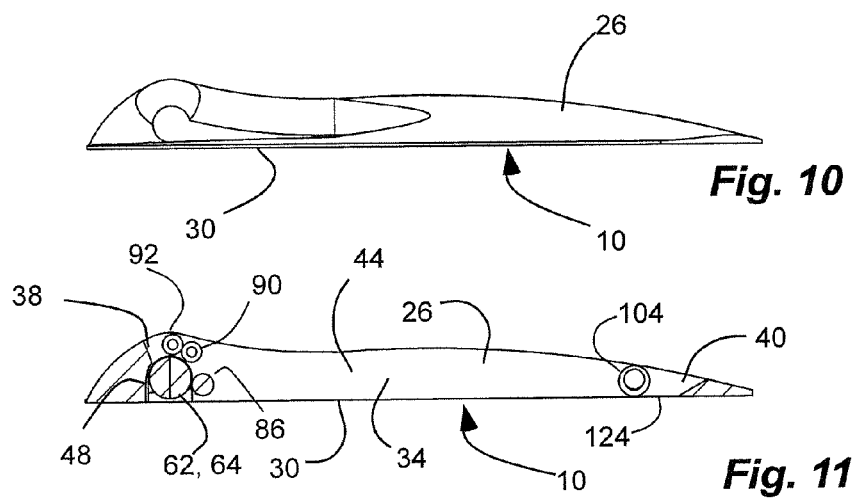
Fig. 10
Fig. 11

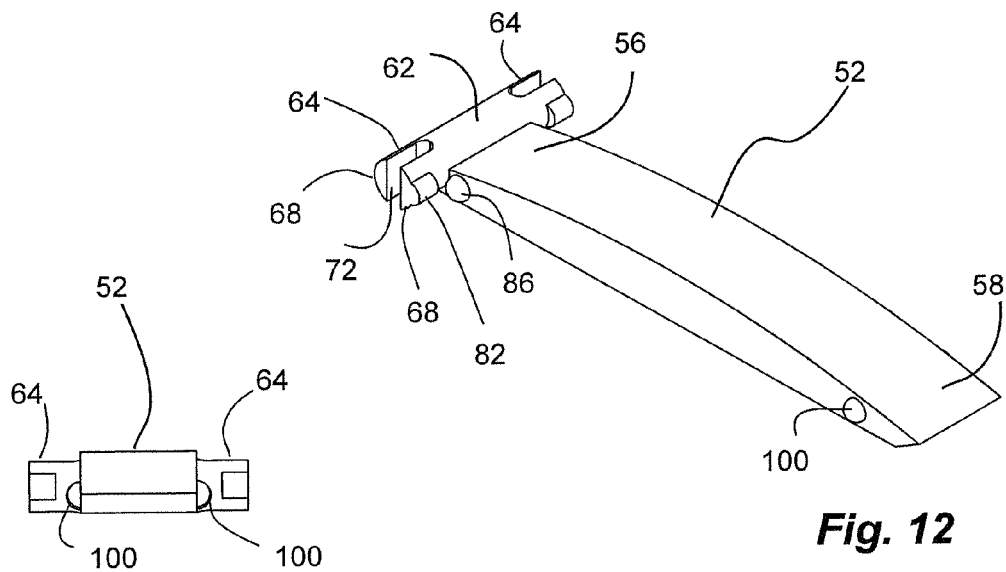
Fig. 12
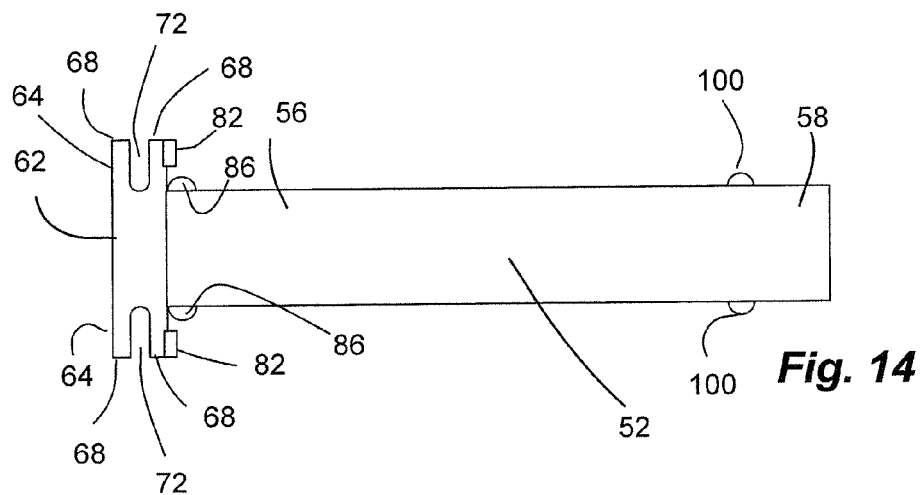
Fig. 13
Fig. 14
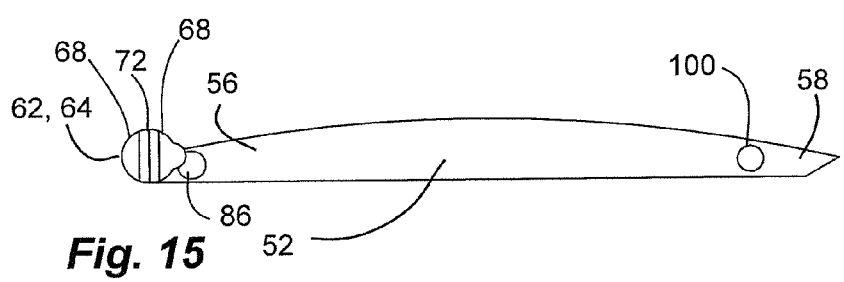
Fig. 15

ATTACHABLE KICKSTAND WITH MULTIPLE POSITIONS FOR CELLULAR PHONE

BACKGROUND

1. Field of the Invention

The present invention relates generally to a kickstand addable to a mobile device, such as a cellular phone.

2. Related Art

Mobile devices, such as cellular phones and tablet computers, are often utilized to view media. It can be tiring to hold the device for extended periods. In addition, it can be inconvenient to prop the device against another object for viewing.

In addition, some devices, such as cellular phones, are often carried by a user. It can be consider inconsiderate or otherwise socially unacceptable to view content on the device in certain situations, such as in a meeting. It can be distracting to reach for and view the device while talking to another person, or while listening to a presenter.

SUMMARY OF THE INVENTION

It has been recognized that it would be advantageous to develop a kickstand device that can support a mobile device in a desired orientation. In addition, it has been recognized that it would be advantageous to develop such a kickstand device that is simple to add or attached to the mobile device, and that has a low profile and rounded or curved profile to avoid snagging or interference with clothing, pockets, briefcases, purses, etc.

The invention provides a kickstand device configured to be affixed to a back surface of a mobile device, such as a cellular phone. The kickstand device comprises a base with an adhesive layer configured to adhere the base to the back surface of the mobile device. An elongated slot is disposed in the base, and has a proximal end and a distal end. The slot has a pair of opposing walls, and a pair of bores at the proximal end of the slot that oppose one another across the slot. An arm is pivotally coupled to the base, and disposable in the elongated slot. The arm has an elongated length extending substantially a length of the elongated slot. The arm has a proximal end and a distal end. The arm has an axel at the proximal end thereof. The axel has a pair of distal ends each disposed in a different one of the pair of bores. Each of the pair of distal ends of the axel is bifurcated to form a pair of fingers with a slot therebetween. The pair of fingers is bendable towards the slot. The pair of fingers and each of the pair of ends have an enlarged relaxed diameter or size when outside of the pair of bores of the base that is greater than a diameter or size of the pair of bores such that the pair of fingers press outwardly against a wall of the pair of bores.

In accordance with a more detailed aspect of the present invention, a press-fit or an interference-fit can be formed between the pair of distal ends of the axel and the pair of bores sufficient to hold a position between the arm and the base under weight of the mobile device without an applied external force. In addition, at least one of the pair of fingers of at least one of the pair of distal ends of the axel can have a protrusion extending radially outwardly therefrom to bear against the wall of a corresponding bore of the pair of bores.

In accordance with a more detailed aspect of the present invention, at least one proximal detent can be disposed on a side of the arm adjacent to the axel at the proximal end of the arm. At least one first dimple can be formed in the slot and disposed adjacent to at least one of the pair of bores. At least one second dimple can be formed in the slot and disposed spaced-apart from the at least one first dimple. At least one distal detent can be disposed on a side of the arm at the distal end of the arm. At least one third dimple can be formed in the slot and disposed at the distal end of the slot. The arm can be pivotal between at least four positions, including: 1) a retracted position in which the arm is disposed in the elongated slot, and in which the at least one distal detent is disposed in the at least one third dimple; 2) a first extended position in which the arm extends from the slot at a first angle with respect to the base, and in which the at least one proximal detent is disposed in the at least one first dimple; 3) a second extended position in which the arm extends from the slot at a second angle with respect to the base, and in which the at least one proximal detent is disposed in the at least one second dimple; and 4) a third extended position in which the arm extends from the slot at a third angle with respect to the base, and in which the at least one distal detent is disposed on an outermost surface of the base.

In accordance with a more detailed aspect of the invention, the kickstand device can be affixed to the back surface of the mobile device adjacent one end thereof, and oriented with the elongated length of the base oriented parallel with a width of the mobile device in a portrait orientation. The mobile device and the kickstand device can have at least seven orientations with respect to a support surface, including: 1) a first portrait orientation in which the mobile device is in a portrait orientation and a bottom edge of the mobile device is disposed on the support surface and the arm is in the first extended position, with the front surface of the mobile device at a first angle with respect to the support surface; 2) a second portrait orientation in which the mobile device is in the portrait orientation and the bottom edge of the mobile device is disposed on the support surface and the arm is in the second extended position, with the front surface of the mobile device at a second angle with respect to the support surface; 3) a first landscape orientation in which the mobile device is in a landscape orientation and a side edge of the mobile device and the distal end of the arm are disposed on the support surface with an apex of the arm and the base elevated away from the support surface and the arm is in the first extended position, with the front surface of the mobile device at a third angle with respect to the support surface; 4) a second landscape orientation in which the mobile device is in the landscape orientation and the side edge of the mobile device and the distal end of the arm are disposed on the support surface with the apex of the arm and the base elevated away from the support surface and the arm is in the second extended position, with the front surface of the mobile device at a fourth angle with respect to the support surface; 5) a third landscape orientation in which the mobile device is in the landscape orientation and the side edge of the mobile device and the distal end of the arm are disposed on the support surface with the apex of the arm and the base adjacent the support surface and the arm is in the first extended position, with the front surface of the mobile device at a fifth angle with respect to the support surface; 6) a fourth landscape orientation in which the mobile device is in the landscape orientation and the side edge of the mobile device and the distal end of the arm are disposed on the support surface with the apex of the arm and the base adjacent the support surface and the arm is in the second extended position, with the front surface of the mobile device at a sixth angle with respect to the support surface; and 7) a flat orientation in which the bottom edge of the mobile device is disposed on the support surface and the arm is in the third extended position, and with the wall extensions of the base and the distal end of the arm on the support surface, with the front surface of the mobile device at a seventh angle with respect to the support surface.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a perspective view of a kickstand device in accordance with an embodiment of the present invention, and shown with an arm thereof in a retracted position;

FIG. 2 is a side view of the kickstand of FIG. 1, shown attached to a back or back surface of a mobile device, namely a cellular phone, and shown with the arm thereof in the retracted position;

FIG. 3 is a front view of the kickstand device of FIG. 1, shown attached to the back or back surface of the mobile device, namely the cellular phone, and shown with the arm thereof in the retracted position;

FIG. 4 is an end view of the kickstand device of FIG. 1, shown attached to the back or back surface of the mobile device, namely the cellular phone, and shown with the arm thereof in the retracted position;

FIG. 7 is a perspective view of the kickstand device of FIG. 1, and shown with the arm thereof in the retracted position;

FIG. 8 is an end view of the kickstand device of FIG. 1, and shown with the arm thereof in the retracted position;

FIG. 9 is a front view of the kickstand device of FIG. 1, and shown with the arm thereof in the retracted position;

FIG. 10 is a side view of the kickstand device of FIG. 1, and shown with the arm thereof in the retracted position;

FIG. 11 is a cross-sectional side view of the kickstand device of FIG. 1, taken along line 11 of FIG. 10;

FIG. 12 is a perspective view of the arm of the kickstand device of FIG. 1;

FIG. 13 is an end view of the arm of FIG. 12;

FIG. 14 is a front view of the arm of FIG. 12; and

FIG. 15 is a side view of the arm of FIG. 12.

Figure 5A:
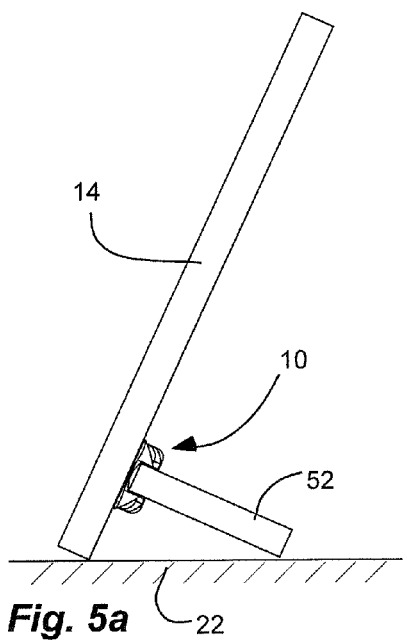
FIG. 5*a* is an end view of the kickstand device of FIG. 1, shown attached to the cellular phone, and with the cellular phone and the kickstand device in a first portrait orientation on a support surface, and with the arm in a first extended position.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "mobile device" is used broadly herein to refer to a portable, hand-held electronic device, including by way of example, a cellular (cell) phone, a smart phone, a tablet computer or tablet, a phablet, a global positioning system (GPS), a mobile media player, a gaming system, a video monitor, and the like. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The mobile device can be rectangular with a smaller width and a greater height. The mobile device can have a portrait orientation, in which the height is greater than the width, and a landscape orientation, in which the width is greater than the height.

The term "cellular phone" is used broadly herein to refer to a cellular phone, a cell phone, a smart phone, etc. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone. The term cellular phone is used broadly herein to refer to phablets. Cellular phones can have various different sizes, including different widths, lengths, or both. The width can extend laterally, side-to-side; while the height can extend longitudinally, up-and-down. The cellular phone can be rectangular with a smaller width and a greater height. The cellular phone can have a portrait orientation, in which the height is greater than the width, and a landscape orientation, in which the width is greater than the height.

In addition, the terms "mobile device" and "cellular phone" are intended to refer to such mobile devices and cellular phones with a case, cover, skin, film, etc. thereon. Furthermore, the terms "back surface" and "back" are used interchangeably for such mobile devices or cellular phones, and are intended to refer to the actual back or back surface of such devices, and the back or back surface of any case, cover, skin, film, etc. disposed thereon.

The terms "interference fit" and "friction fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

Description

Figure 5B:
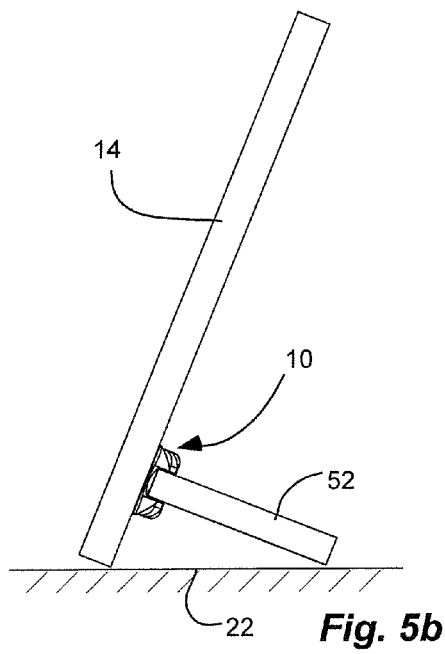
FIG. 5*b* is an end view of the kickstand device of FIG. 1, shown attached to the cellular phone, and with the cellular phone and the kickstand device in a second portrait orientation on the support surface, and with the arm in a second extended position.
Figure 5C:
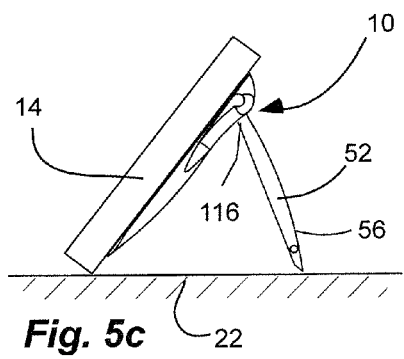
FIG. 5*c* is a side view of the kickstand device of FIG. 1, shown attached to the cellular phone, and with the cellular phone and the kickstand device in a first landscape orientation on the support surface, and with the arm in the first extended position.
Figure 5D:
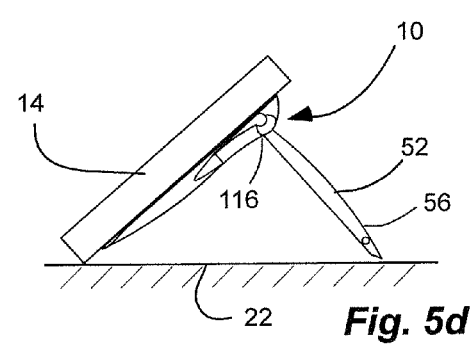
FIG. 5*d* is a side view of the kickstand device of FIG. 1, shown attached to the cellular phone, and with the cellular phone and the kickstand device in a second landscape orientation on the support surface, and with the arm in the second extended position.
Figure 5E:
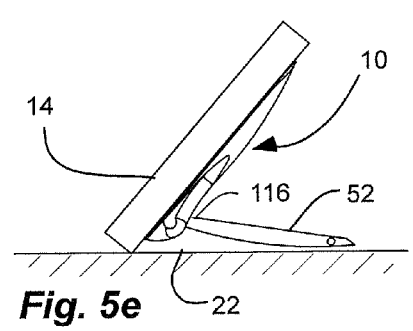
FIG. 5*e* is a side view of the kickstand device of FIG. 1, shown attached to the cellular phone, and with the cellular phone and the kickstand device in a third landscape orientation on the support surface, and with the arm in the first extended position.
Figure 5F:
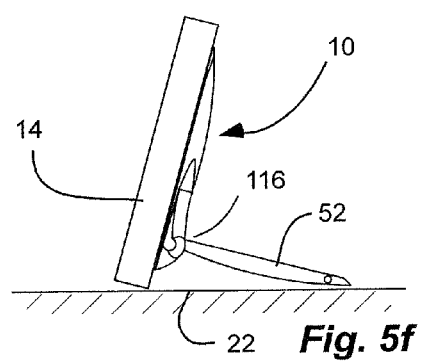
FIG. 5*f* is a side view of the kickstand device of FIG. 1, shown attached to the cellular phone, and with the cellular phone and the kickstand device in a fourth landscape orientation on the support surface, and with the arm in the second extended position.
Figure 5G:
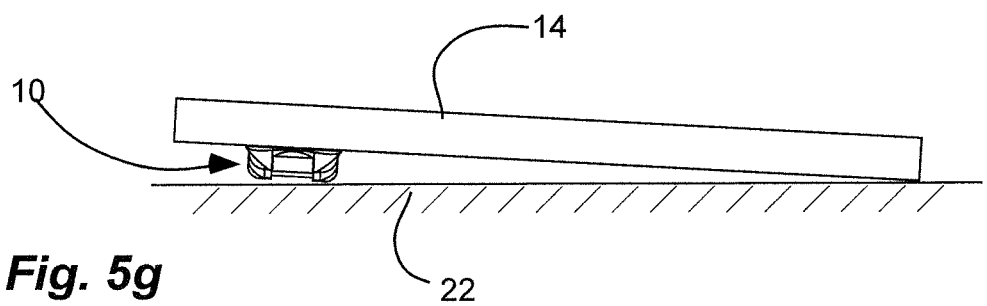
FIG. 5*g* is an end view of the kickstand device of FIG. 1, shown attached to the cellular phone, and with the cellular phone and the kickstand device in a flat orientation on the support surface, and with the arm in a third extended position.
Figure 5H:
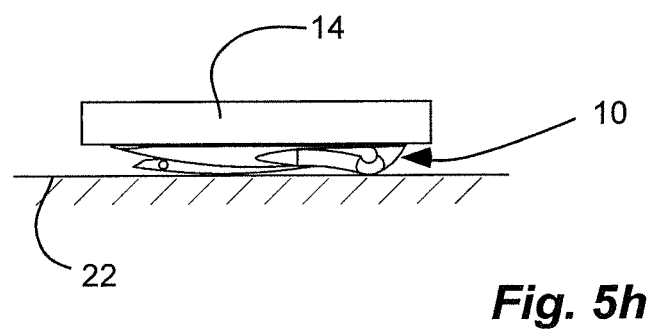
FIG. 5*h* is a side view of the kickstand device of FIG. 1, shown attached to the cellular phone, and with the cellular phone and the kickstand device in the flat orientation on the support surface, and with the arm in the third extended position.
Figure 6:
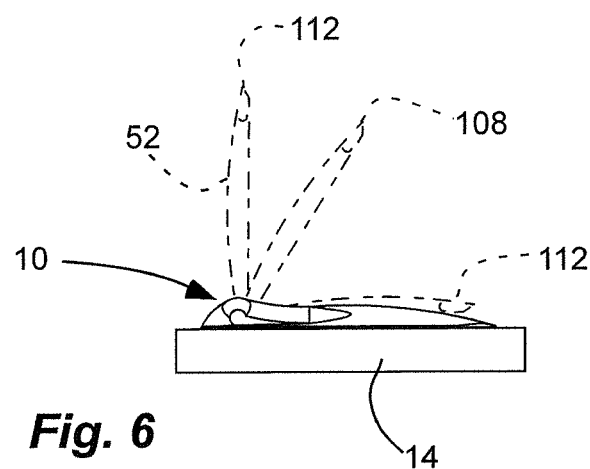
FIG. 6 is side view of the kickstand device of FIG. 1, shown attached to the cellular phone, and showing various positions of the arm, including the retracted position, the first extended position, the second extended position, and the third extended position.

As illustrated in FIG. 1-15, a kickstand device, indicated generally at 10, in an example implementation in accordance with the invention is shown attached to a mobile device 14, namely a cellular phone. The kickstand 10 can be attached to a back or back surface 18 of the mobile device 14 to provide a stand carried with the mobile device to allow the mobile device to be positioned on a support surface 22 as a desired angle for viewing. The back or back surface 18 of the mobile device 14 includes the back or back surface of any case, cover, skin, film, etc. disposed thereon. The kickstand 10 can be low profile to facilitate use with the mobile device without interfering with clothing, pocket, brief case, purse, or the like, in which the mobile device can be removed and inserted repeatedly. The kickstand 10 can be adhered to the mobile device 14 by an adhesive or adhesive layer.

The kickstand 10 comprises a base 26 with an adhesive layer 30 to adhere the base to the back surface 18 of the mobile device 14. The adhesive layer can be adhered to a back of the base, and can include a release liner on the side opposite the base. The release liner can be removed to install the base or the kickstand on the mobile device. The adhesive layer can be an adhesive tape. The base 26 can be elongated or can have an elongated length. In addition, the base 26 has an outermost surface or outer surface. Furthermore, the base 26 has a slot 34 that can be elongated, and that can extend or be aligned with the elongated length of the base. The slot 34 can have a proximal end 38 and a distal end 40. In addition, the slot 34 has a pair of opposing walls 44 disposed opposite one another. Furthermore, the slot 34 has a pair of bores 48 at the proximal end 38, and opposing one another across the slot. The pair of bores is aligned with one another. In one aspect, the base can be formed of plastic by injection molding.

In addition, the kickstand 10 can have an arm 52 pivotally coupled to the base 26. The arm 52 can be elongated or have an elongated length extending substantially a length of the elongated slot. The arm 52 is disposable in the elongated slot 34 and pivotal in the slot between a retracted position in the slot, and an extended position extending from the slot. The arm 52 has a proximal end 56 and a distal end 58. An axel 62 is disposed at or formed at the proximal end 56 of the arm. The axel 62 has a pair of opposite distal ends 64 that are each disposed in a different one of the pair of bores 48. Thus, the pair of bores 48 in the base 26 receives the axel 62, or distal ends 64 thereof, of the arm 52 to pivotally couple the arm to the base.

Each of the pair of distal ends 64 of the axel 62 can be bifurcated to form a pair of parallel fingers 68. The fingers 68 are parallel with an axis of the axel 62 and have a slot 72 therebetween. The arm 52, the axel 62 and the pair of distal ends 64 can be integrally formed together at the same time, and can be formed of a material that is sufficiently flexible and resilient to allow the pair of fingers 68 to bend into the slot 72 and towards one another. In one aspect, the arm can be formed of plastic by injection molding. Thus, the pair of fingers 68 can be bendable inwardly towards one another and the slot 72. The pair of fingers 68 and the pair of distal ends 64 can have an enlarged relaxed diameter or size when outside of the pair of bores of the base, and a reduced tensioned diameter or size when inside the pair of bores 48. The relaxed diameter or size can be then the pair of fingers and/or the pair of distal ends is outside of the bore, with the fingers relaxed, and without being displaced inwardly to fit inside the pair of bores. The reduced tensioned diameter or size can be when the pair of fingers and/or the pair of distal ends is inside the pair of bores, with the fingers under tension from being flexed inwardly. The reduced tensioned diameter or size is less than the enlarged relaxed diameter or size. The enlarged relaxed diameter or size of the pair of fingers or the pair of distal ends is greater than a diameter or size of the pair of bores. Thus, the pair of fingers are displaced inwardly towards one another and into the slot when in the pair of bores so that the pair of fingers press outwardly against a wall of the pair of bores forming a press-fit or an interference-fit between the pair of distal ends of the axel and the pair of bores sufficient to hold a position between the arm and the base under weight of the mobile device without an applied external force. Thus, the position of the arm relative to the base is maintained by the press-fit or interference-fit between the pair of fingers or the pair of distal ends and the pair of bores, even under the weight of the mobile device, and an external force, such as deliberate pressing by a user, is required to move or reposition the arm relative to the base. In addition, one or more of the pair of fingers 68 of the pair of distal ends of the axel can have a protrusion 82 extending radially outwardly therefrom, and can further bearing against the wall of a corresponding wall of the pair of bores 48. Thus, the protrusion 82 can increase the friction or grip between the pair of fingers and the pair of bores.

In addition, the arm 52 can a pair of proximal detents 86 each disposed on a different side of the arm, and positioned opposite to one another, and disposed adjacent to the axel 62 at the proximal end 56 of the arm. In one aspect, the arm can have a pair of opposite proximal detents disposed on opposite sides of the arm. In another aspect, the arm can have a single proximal detent disposed on one side of the arm. A distance between outermost ends of the pair of proximal detents 86 can be greater than a width across the opposing walls 44 of the slot 34. Thus, the pair of proximal detents can form a press-fit or an interference-fit between the pair of proximal detents and the opposing walls of the slot.

The base 26 and/or slot 34 has first and second pairs of dimples corresponding to the proximal detents, but located at different locations corresponding to different positions of the arm with respect to the base. The first pair of dimples 90 (FIG. 11) is formed in the slot and is disposed adjacent to the pair of bores. The dimples oppose one another across the slot. The second pair of dimples 92 (FIG. 11) is formed in the slot and is disposed adjacent to the pair of bores and spaced-apart from the first pair of dimples 90. Again, the dimples oppose one another across the slot. The opposing walls 44 of the slot 34 can extend outwardly beyond the pair of bores 48 to define wall extensions 96. The first and second pair of dimples can be disposed in the wall extensions 96. The first pair of dimples 90 receives the pair of proximal detents 86 in a first position of the arm with respect to the base; while the second pair of dimples 92 receives the pair of proximal detents 86 in a second position of the arm with respect to the base.

In addition, the arm 52 can have a pair of distal detents 100 each disposed on a different side of the arm, and positioned opposite to one another, and disposed at the distal end 58 of the arm. In one aspect, the arm can have a pair of distal detents disposed on opposite sides of the arm. In another aspect, the arm can have a single distal detent disposed on one side of the arm. Again, a distance between outermost ends of the pair of distal detents 100 can be greater than the width across the opposing walls 44 of the slot 34. Thus, the pair of distal detents can form a press-fit or an interference-fit between the pair of distal detents and the opposing walls of the slot. A third pair of dimples 104 (FIG. 11) can be formed in the slot 34 and disposed at the distal end 40 of the slot, and opposing one another across the slot. The third pair of dimples 104 receives the pair of distal detents 100 in a retracted position of the arm with respect to the base.

In one aspect, the arm 52 being pivotal with respect to the base 26 and the slot 34 between at least four positions. In a retracted position (FIGS. 1-4 and 7-11), the arm 52 is disposed in the elongated slot 34, and the pair of distal detents 100 is disposed in the third pair of dimples 104. Thus, the distal detents in the third dimples can maintain the arm in the slot until acted upon by an external force, such as the user pulling the arm from the slot, to resist inadvertent deployment of the arm and inadvertent snagging of the arm. In a first extended position (FIGS. 5b, 5d and 5f; and indicated by 108 in FIG. 6), the arm 52 extends from the slot 34 at a first angle with respect to the base 26, and in the pair of proximal detents 86 is disposed in the first pair of dimples 90. Thus, the proximal detents in the first dimples can maintain the arm at the first angle until acted upon by an external force to maintain the mobile device at a desired angle. In a second extended position (FIGS. 5a, 5c and 5e; and indicated by 112 in FIG. 6), the arm 52 extends from the slot 34 at a second angle with respect to the base 26, and the pair of proximal detents 86 is disposed in the second pair of dimples 92. Thus, the proximal detents in the second dimples can maintain the arm at the second angle until acted upon by an external force to maintain the mobile device at a desired angle. In a third extended position (FIGS. 5g and 5h; and indicated by 116 in FIG. 6), the arm 52 extends from the slot 34 at a third angle with respect to the base 26, and the pair of distal detents 100 is disposed on the outermost surface of the base 26. Thus, the distal end of the arm is more level with the wall extensions 96 of the slot so that the mobile device can be disposed on the support surface 22 without tilting.

As described above, the kickstand device 10 can be affixed to the back surface of the mobile device 14 adjacent one end thereof, and can be oriented with the elongated length of the base oriented parallel with a width of the mobile device in a portrait orientation, as shown (see FIG. 3). The mobile device 14 with the kickstand device 10 thereon can have at least seven orientations with respect to the support surface 22 in order to achieve a desired orientation of the mobile device. In a first portrait orientation (FIG. 5a), the mobile device 14 is in a portrait orientation and a bottom edge of the mobile device is disposed on the support surface 22, and the arm 52 is in the first extended position, with the front surface of the mobile device at a first angle with respect to the support surface. In a second portrait orientation (FIG. 5b), the mobile device 14 is in the portrait orientation and the bottom edge of the mobile device is disposed on the support surface 22, and the arm 52 is in the second extended position, with the front surface of the mobile device at a second angle with respect to the support surface. In a first landscape orientation (FIG. 5c), the mobile device 14 is in a landscape orientation and a side edge of the mobile device and the distal end 58 of the arm 52 are disposed on the support surface 22, with an apex 116 of the arm and the base elevated away from the support surface; and the arm 52 is in the first extended position, with the front surface of the mobile device at a third angle with respect to the support surface. In a second landscape orientation (FIG. 5d), the mobile device 14 is in the landscape orientation and the side edge of the mobile device and the distal end 58 of the arm 52 are disposed on the support surface 22, with the apex 116 of the arm and the base elevated away from the support surface; and the arm 52 is in the second extended position, with the front surface of the mobile device at a fourth angle with respect to the support surface. In a third landscape orientation (FIG. 5e), the mobile device 14 is in the landscape orientation and the side edge of the mobile device and the distal end of the arm are disposed on the support surface 22, with the apex 116 of the arm and the base adjacent the support surface; and the arm 52 is in the first extended position, with the front surface of the mobile device at a fifth angle with respect to the support surface. In a fourth landscape orientation (FIG. 5f), the mobile device 14 is in the landscape orientation and the side edge of the mobile device and the distal end 58 of the arm 52 are disposed on the support surface 22, with the apex 116 of the arm and the base adjacent the support surface; and the arm 52 is in the second extended position, with the front surface of the mobile device at a sixth angle with respect to the support surface. In a flat orientation (FIGS. 5g and 5h), the bottom edge of the mobile device 14 is disposed on the support surface and the arm 52 is in the third extended position, and the wall extensions 96 of the base 26 and the distal end 58 of the arm 52 are on the support surface 22, with the front surface of the mobile device at a seventh angle with respect to the support surface.

The base 26 can have a notch 120 formed therein at the distal end 40 of the slot 34. The notch can extend into an outer surface of the base, deeper than the distal end 58 of the arm 52 in the retracted position to define a fingernail notch to assist a user in pivoting the arm from the retracted position to one of the extended positions. A user is able to insert a fingernail into the notch, and into the slot under the distal end of the arm to lift the distal end of the arm out of the slot.

The elongated slot 34 in the base 26 can extend through a back of the base to form an elongated aperture 124 (FIG. 11). In addition, the pair of bores 48 can be open to the back of the base along with the slot. The opening can facilitate assembly of the arm to the base.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A kickstand device configured to be affixed to a back surface of a mobile device, the kickstand device comprising:
   a) a base with an adhesive layer configured to adhere the base to the back surface of the mobile device;

b) an elongated slot disposed in the base and having a proximal end and a distal end, and having a pair of opposing walls and a pair of bores in the slot at the proximal end of the slot and opposing one another across the slot;

c) an arm pivotally coupled to the base and disposable in the elongated slot and having an elongated length extending substantially a length of the elongated slot, the arm having a proximal end and a distal end;

d) the arm having an axel at the proximal end thereof, the axel having a pair of distal ends each disposed in a different one of the pair of bores;

e) each of the pair of distal ends of the axel being bifurcated to form a pair of fingers with a slot therebetween with the pair of fingers being bendable towards the slot, the pair of fingers and each of the pair of ends having an enlarged relaxed diameter or size when outside of the pair of bores of the base greater than a diameter or size of the pair of bores such that the pair of fingers press outwardly against a wall of the pair of bores;

f) at least one proximal detent disposed on a side of the arm and disposed adjacent to the axel at the proximal end of the arm;

g) at least one dimple formed in the slot and disposed adjacent to at least one of the pair of bores;

h) at least one distal detent disposed on a side of the arm and disposed at the distal end of the arm;

i) at least one dimple formed in the slot and disposed at the distal end of the slot;

j) the arm being pivotal between:
 i) a retracted position in which the arm is disposed in the elongated slot, and in which the at least one distal detent is disposed in the at least one dimple at the distal end of the slot;
 ii) an extended position in which the arm extends from the slot and the at least one proximal detent is disposed in the at least one dimple adjacent to at least one of the pair of bores; and
 iii) another extended position in which the arm extends from the slot and the at least one distal detent is disposed on an outermost surface of the base.

2. The device in accordance with claim 1, further comprising:

a) the at least one dimple formed in the slot and disposed adjacent to at least one of the pair of bores is at least one first dimple;

b) at least one second dimple formed in the slot and disposed spaced-apart from the at least one first dimple;

c) the at least one dimple formed in the slot and disposed at the distal end of the slot is at least one third dimple;

d) the arm being pivotal between at least four positions, including:
 i) the retracted position;
 ii) the extended position in which the arm extends from the slot and the at least one proximal detent is disposed in the at least one first dimple, defining a first extending position;
 iii) a second extended position in which the arm extends from the slot at a second angle with respect to the base, and in which the at least one proximal detent is disposed in the at least one second dimple; and
 iv) the another extended position in which the arm extends from the slot and the at least one distal detent is disposed on an outermost surface of the base, defining a third extended position.

3. The device in accordance with claim 2, wherein the kickstand device is affixed to the back surface of the mobile device adjacent one end thereof, and oriented with the elongated length of the base oriented parallel with a width of the mobile device in a portrait orientation; and wherein the mobile device and the kickstand device have at least seven orientations with respect to a support surface, including:

a) a first portrait orientation in which the mobile device is in a portrait orientation and a bottom edge of the mobile device is disposed on the support surface and the arm is in the first extended position, with the front surface of the mobile device at a first angle with respect to the support surface;

b) a second portrait orientation in which the mobile device is in the portrait orientation and the bottom edge of the mobile device is disposed on the support surface and the arm is in the second extended position, with the front surface of the mobile device at a second angle with respect to the support surface;

c) a first landscape orientation in which the mobile device is in a landscape orientation and a side edge of the mobile device and the distal end of the arm are disposed on the support surface with an apex of the arm and the base elevated away from the support surface and the arm is in the first extended position, with the front surface of the mobile device at a third angle with respect to the support surface;

d) a second landscape orientation in which the mobile device is in the landscape orientation and the side edge of the mobile device and the distal end of the arm are disposed on the support surface with the apex of the arm and the base elevated away from the support surface and the arm is in the second extended position, with the front surface of the mobile device at a fourth angle with respect to the support surface;

e) a third landscape orientation in which the mobile device is in the landscape orientation and the side edge of the mobile device and the distal end of the arm are disposed on the support surface with the apex of the arm and the base adjacent the support surface and the arm is in the first extended position, with the front surface of the mobile device at a fifth angle with respect to the support surface;

f) a fourth landscape orientation in which the mobile device is in the landscape orientation and the side edge of the mobile device and the distal end of the arm are disposed on the support surface with the apex of the arm and the base adjacent the support surface and the arm is in the second extended position, with the front surface of the mobile device at a sixth angle with respect to the support surface; and g) a flat orientation in which the bottom edge of the mobile device is disposed on the support surface and the arm is in the third extended position, and with the wall extensions of the base and the distal end of the arm on the support surface, with the front surface of the mobile device at a seventh angle with respect to the support surface.

4. The device in accordance with claim 1, further comprising:

a notch formed in the base at the distal end of the slot and extending deeper than the distal end of the arm in the retracted position defining a fingernail notch.

5. The device in accordance with claim 1, further comprising:

at least one of the pair of fingers of at least one of the pair of ends of the axel further having a protrusion extending radially outwardly therefrom and bearing against the wall of a corresponding bore of the pair of bores.

6. The device in accordance with claim 1, wherein the elongated slot in the base extends through a back of the base to form an elongated aperture; and wherein the pair of bores is open to the back of the base along with the slot.

7. A kickstand device in combination with a mobile device with front and back surfaces, the kickstand device comprising:
- a) a base with an adhesive layer adhering the base to the back surface of the mobile device, the base having an elongated length, the base having an outermost surface;
- b) an elongated slot aligned with the elongated length of the base and having a proximal end and a distal end, and having a pair of opposing walls and a pair of bores in the slot at the proximal end of the slot and opposing one another across the slot;
- c) an arm pivotally coupled to the base and disposable in the elongated slot and having an elongated length extending substantially a length of the elongated slot, the arm having a proximal end and a distal end;
- d) the arm having an axel formed at the proximal end thereof, the axel having a pair of opposite distal ends each disposed in a different one of the pair of bores;
- c) each of the pair of distal ends of the axel being bifurcated to form a pair of parallel fingers parallel with an axis of the axel and with a slot therebetween, and with the pair of fingers being bendable towards the slot, the pair of fingers and each of the pair of ends having an enlarged relaxed diameter or size when outside of the pair of bores of the base, and a reduced tensioned diameter or size when inside the pair of bores, the reduced tensioned diameter or size being less than the enlarged relaxed diameter or size, the enlarged relaxed diameter or size being greater than a diameter or size of the pair of bores such that the pair of fingers press outwardly against a wall of the pair of bores forming a press-fit or an interference-fit between the pair of ends of the axel and the pair of bores sufficient to hold a position between the arm and the base under weight of the mobile device without an applied external force;
- f) at least one of the pair of fingers of at least one of the pair of ends of the axel further having a protrusion extending radially outwardly therefrom and bearing against the wall of a corresponding bore of the pair of bores;
- g) a pair of proximal detents each disposed on a different side of the arm and positioned opposite to one another and disposed adjacent to the axel at the proximal end of the arm, a distance between outermost ends of the pair of proximal detents being greater than a width across the opposing walls of the slot and forming a press-fit or an interference-fit between the pair of proximal detents and the opposing walls of the slot;
- h) a first pair of dimples formed in the slot and opposing one another across the slot and disposed adjacent to the pair of bores;
- h) a second pair of dimples formed in the slot and opposing one another across the slot and disposed adjacent to the pair of bores and spaced-apart from the first pair of dimples;
- i) the opposing walls of the slot extending outwardly beyond the pair of bores defining wall extensions, and the first and second pair of dimples disposed in the wall extensions;
- j) a pair of distal detents each disposed on a different side of the arm and positioned opposite to one another and disposed at the distal end of the arm, a distance between outermost ends of the pair of distal detents being greater than the width across the opposing walls of the slot and forming a press-fit or an interference-fit between the pair of distal detents and the opposing walls of the slot;
- k) a third pair of dimples formed in the slot and opposing one another across the slot and disposed at the distal end of the slot;
- l) the arm being pivotal between at least four positions, including:
  - i) a retracted position in which the arm is disposed in the elongated slot, and in which the pair of distal detents is disposed in the third pair of dimples;
  - ii) a first extended position in which the arm extends from the slot at a first angle with respect to the base, and in which the pair of proximal detents is disposed in the first pair of dimples;
  - iii) a second extended position in which the arm extends from the slot at a second angle with respect to the base, and in which the pair of proximal detents is disposed in the second pair of dimples; and
  - iv) a third extended position in which the arm extends from the slot at a third angle with respect to the base, and in which the pair of distal detents is disposed on the outermost surface of the base; and
- m) a notch formed in the base at the distal end of the slot and extending deeper than the distal end of the arm in the retracted position defining a fingernail notch.

8. The combination in accordance with claim 7, wherein the kickstand device is affixed to the back surface of the mobile device adjacent one end thereof, and oriented with the elongated length of the base oriented parallel with a width of the mobile device in a portrait orientation; and wherein the mobile device and the kickstand device have at least seven orientations with respect to a support surface, including:
- a) a first portrait orientation in which the mobile device is in a portrait orientation and a bottom edge of the mobile device is disposed on the support surface and the arm is in the first extended position, with the front surface of the mobile device at a first angle with respect to the support surface;
- b) a second portrait orientation in which the mobile device is in the portrait orientation and the bottom edge of the mobile device is disposed on the support surface and the arm is in the second extended position, with the front surface of the mobile device at a second angle with respect to the support surface;
- c) a first landscape orientation in which the mobile device is in a landscape orientation and a side edge of the mobile device and the distal end of the arm are disposed on the support surface with an apex of the arm and the base elevated away from the support surface and the arm is in the first extended position, with the front surface of the mobile device at a third angle with respect to the support surface;
- d) a second landscape orientation in which the mobile device is in the landscape orientation and the side edge of the mobile device and the distal end of the arm are disposed on the support surface with the apex of the arm and the base elevated away from the support surface and the arm is in the second extended position, with the front surface of the mobile device at a fourth angle with respect to the support surface;
- e) a third landscape orientation in which the mobile device is in the landscape orientation and the side edge of the mobile device and the distal end of the arm are disposed on the support surface with the apex of the arm and the base adjacent the support surface and the arm is in the first extended position, with the front surface of the mobile device at a fifth angle with respect to the support surface;

f) a fourth landscape orientation in which the mobile device is in the landscape orientation and the side edge of the mobile device and the distal end of the arm are disposed on the support surface with the apex of the arm and the base adjacent the support surface and the arm is in the second extended position, with the front surface of the mobile device at a sixth angle with respect to the support surface; and g) a flat orientation in which the bottom edge of the mobile device is disposed on the support surface and the arm is in the third extended position, and with the wall extensions of the base and the distal end of the arm on the support surface, with the front surface of the mobile device at a seventh angle with respect to the support surface.

9. The combination in accordance with claim 7, wherein the elongated slot in the base extends through a back of the base to form an elongated aperture; and wherein the pair of bores is open to the back of the base along with the slot.

10. A kickstand device configured to be affixed to a back surface of a mobile device, the kickstand device comprising:
  a) a base with an adhesive layer configured to adhere the base to the back surface of the mobile device, the base having an elongated length, the base having an outermost surface;
  b) an elongated slot aligned with the elongated length of the base and having a proximal end and a distal end, and having a pair of opposing walls and a pair of bores in the slot at the proximal end of the slot and opposing one another across the slot;
  c) an arm pivotally coupled to the base and disposable in the elongated slot and having an elongated length extending substantially a length of the elongated slot, the arm having a proximal end and a distal end;
  d) the arm having an axel at the proximal end thereof, the axel having a pair of distal ends each disposed in a different one of the pair of bores;
  e) each of the pair of distal ends of the axel being bifurcated to form a pair of fingers with a slot therebetween with the pair of fingers being bendable towards the slot, the pair of fingers and each of the pair of ends having an enlarged relaxed diameter or size when outside of the pair of bores of the base, and a reduced tensioned diameter or size when inside the pair of bores, the reduced tensioned diameter or size being less than the enlarged relaxed diameter or size, the enlarged relaxed diameter or size being greater than a diameter or size of the pair of bores such that the pair of fingers press outwardly against a wall of the pair of bores forming a press-fit or an interference-fit between the pair of ends of the axel and the pair of bores sufficient to hold a position between the arm and the base under weight of the mobile device without an applied external force;
  f) a pair of proximal detents each disposed on a different side of the arm and positioned opposite to one another and disposed adjacent to the axel at the proximal end of the arm, a distance between outermost ends of the pair of proximal detents being greater than a width across the opposing walls of the slot and forming a press-fit or an interference-fit between the pair of proximal detents and the opposing walls of the slot;
  g) a pair of dimples formed in the slot and opposing one another across the slot and disposed adjacent to the pair of bores;
  h) a pair of distal detents each disposed on a different side of the arm and positioned opposite to one another and disposed at the distal end of the arm, a distance between outermost ends of the pair of distal detents being greater than the width across the opposing walls of the slot and forming a press-fit or an interference-fit between the pair of distal detents and the opposing walls of the slot;
  i) a pair of dimples formed in the slot and opposing one another across the slot and disposed at the distal end of the slot; and
  j) the arm being pivotal between:
    i) a retracted position in which the arm is disposed in the elongated slot, and in which the pair of distal detents is disposed in the pair of dimples at the distal end of the slot;
    ii) an extended position in which the arm extends from the slot and the pair of proximal detents is disposed in the pair of dimples adjacent to the pair of bores; and
    iii) another extended position in which the arm extends from the slot and the pair of distal detents is disposed on the outermost surface of the base.

11. The device in accordance with claim 10, further comprising:
  a) the pair of dimples formed in the slot and opposing one another across the slot and disposed adjacent to the pair of bores is a first pair of dimples;
  b) a second pair of dimples formed in the slot and opposing one another across the slot and disposed adjacent to the pair of bores and spaced-apart from the first pair of dimples;
  c) the opposing walls of the slot extending outwardly beyond the pair of bores defining wall extensions, and the first and pair of dimples disposed in the wall extensions;
  d) the pair of dimples formed in the slot and opposing one another across the slot and disposed at the distal end of the slot is a third pair of dimples;
  e) the arm being pivotal between at least four positions, including:
    i) the retracted position;
    ii) the extended position in which the arm extends from the slot and the pair of proximal detents is disposed in the first pair of dimples, defining a first extended position;
    iii) a second extended position in which the arm extends from the slot at a second angle with respect to the base, and in which the pair of proximal detents is disposed in the pair of dimples; and
    iv) the another extended position in which the arm extends from the slot and the pair of distal detents is disposed on the outermost surface of the base, defining a third extended position.

12. The device in accordance with claim 11, wherein the kickstand device is affixed to the back surface of the mobile device adjacent one end thereof, and oriented with the elongated length of the base oriented parallel with a width of the mobile device in a portrait orientation; and wherein the mobile device and the kickstand device have at least seven orientations with respect to a support surface, including:
  a) a first portrait orientation in which the mobile device is in a portrait orientation and a bottom edge of the mobile device is disposed on the support surface and the arm is in the first extended position, with the from surface of the mobile device at a first angle with respect to the support surface;
  b) a second portrait orientation in which the mobile device is in the portrait orientation and the bottom edge of the mobile device is disposed on the support surface and the arm is in the second extended position, with the front surface of the mobile device at a second angle with respect to the support surface;
c) a first landscape orientation in which the mobile device is in a landscape orientation and a side edge of the mobile device and the distal end of the arm are disposed on the support surface with an apex of the arm and the base elevated away from the support surface and the arm is in the first extended position, with the front surface of the mobile device at a third angle with respect to the support surface;
d) a second landscape orientation in which the mobile device is in the landscape orientation and the side edge of the mobile device and the distal end of the arm are disposed on the support surface with the apex of the arm and the base elevated away from the support surface and the arm is in the second extended position, with the front surface of the mobile device at a fourth angle with respect to the support surface;
e) a third landscape orientation in which the mobile device is in the landscape orientation and the side edge of the mobile device and the distal end of the arm are disposed on the support surface with the apex of the arm and the base adjacent the support surface and the arm is in the first extended position, with the front surface of the mobile device at a fifth angle with respect to the support surface;
f) a fourth landscape orientation in which the mobile device is in the landscape orientation and the side edge of the mobile device and the distal end of the arm are disposed on the support surface with the apex of the arm and the base adjacent the support surface and the arm is in the second extended position, with the front surface of the mobile device at a sixth angle with respect to the support surface; and
g) a flat orientation in which the bottom edge of the mobile device is disposed on the support surface and the arm is in the third extended position, and with the wall extensions of the base and the distal end of the arm on the support surface, with the front surface of the mobile device at a seventh angle with respect to the support surface.

13. The device in accordance with claim 10, further comprising:
a notch formed in the base at the distal end of the slot and extending deeper than the distal end of the arm in the retracted position defining a fingernail notch.

14. The device in accordance with claim 10, further comprising:
at least one of the pair of fingers of at least one of the pair of ends of the axel further having a protrusion extending radially outwardly therefrom and bearing against the wall of a corresponding bore of the pair of bores.

15. The device in accordance with claim 10, wherein the elongated slot in the base extends through a back of the base to form an elongated aperture; and wherein the pair of bores is open to the back of the base along with the slot.

\* \* \* \* \*